United States Patent
Hsiang et al.

(10) Patent No.: US 10,983,586 B2
(45) Date of Patent: Apr. 20, 2021

(54) POWER MANAGEMENT SYSTEM AND POWER MANAGEMENT METHOD

(71) Applicant: Qisda Corporation, Taoyuan (TW)

(72) Inventors: Shih-Min Hsiang, Taoyuan (TW); Cheng-Nan Lien, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 12 days.

(21) Appl. No.: 16/572,650

(22) Filed: Sep. 17, 2019

(65) Prior Publication Data

US 2020/0117266 A1 Apr. 16, 2020

(30) Foreign Application Priority Data

Oct. 16, 2018 (CN) .......................... 201811201990.X

(51) Int. Cl.
- *G06F 1/32* (2019.01)
- *G06F 1/3287* (2019.01)
- *G06F 1/3206* (2019.01)

(52) U.S. Cl.
CPC .......... *G06F 1/3287* (2013.01); *G06F 1/3206* (2013.01)

(58) Field of Classification Search
CPC .......................... G06F 1/3287; G06F 1/3206
See application file for complete search history.

(56) References Cited

U.S. PATENT DOCUMENTS

| | | | | |
|---|---|---|---|---|
| 8,745,417 B2 * | 6/2014 | Huang | .................. | G06F 1/3293 713/300 |
| 10,122,576 B2 * | 11/2018 | Bhesania | .............. | H04W 84/20 |
| 2017/0039155 A1 * | 2/2017 | Feng | ..................... | G06F 1/3287 |

\* cited by examiner

*Primary Examiner* — Stefan Stoynov

(57) ABSTRACT

A power management system including a first circuit board, a second circuit board and a connection cable is provided. The connection cable is compatible with USB type-C specification and connects the first circuit board and the second circuit board. When the first circuit board determines that a first power state of the first circuit board changes, the first circuit board transmits the first signal to the second circuit board through a configuration channel (CC) terminal of the connection cable, the second circuit board changes a second power state of the second circuit board according to the first signal.

19 Claims, 5 Drawing Sheets

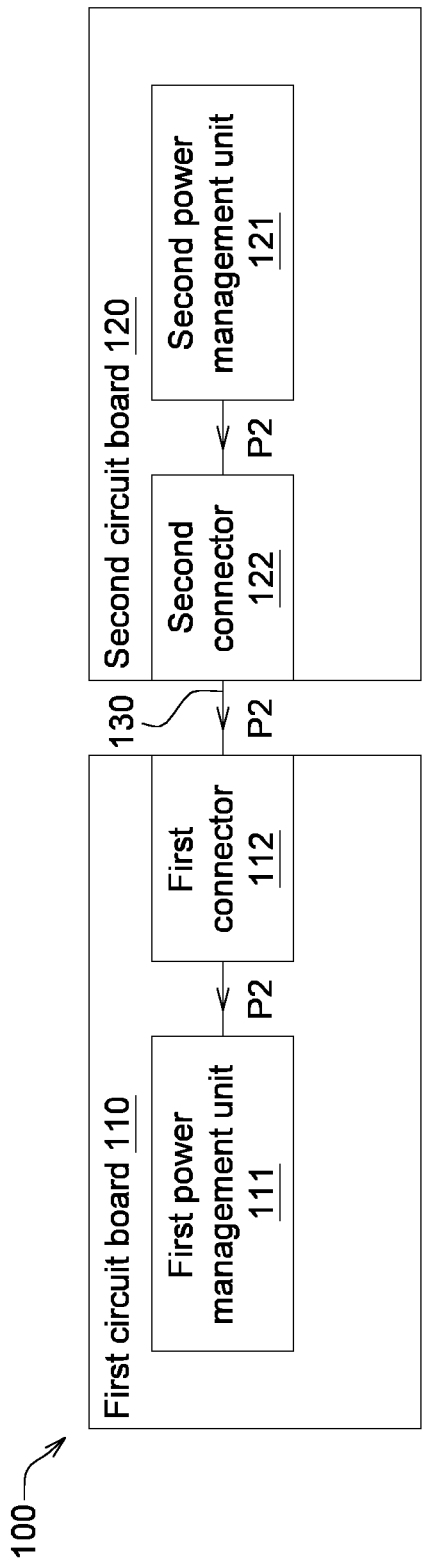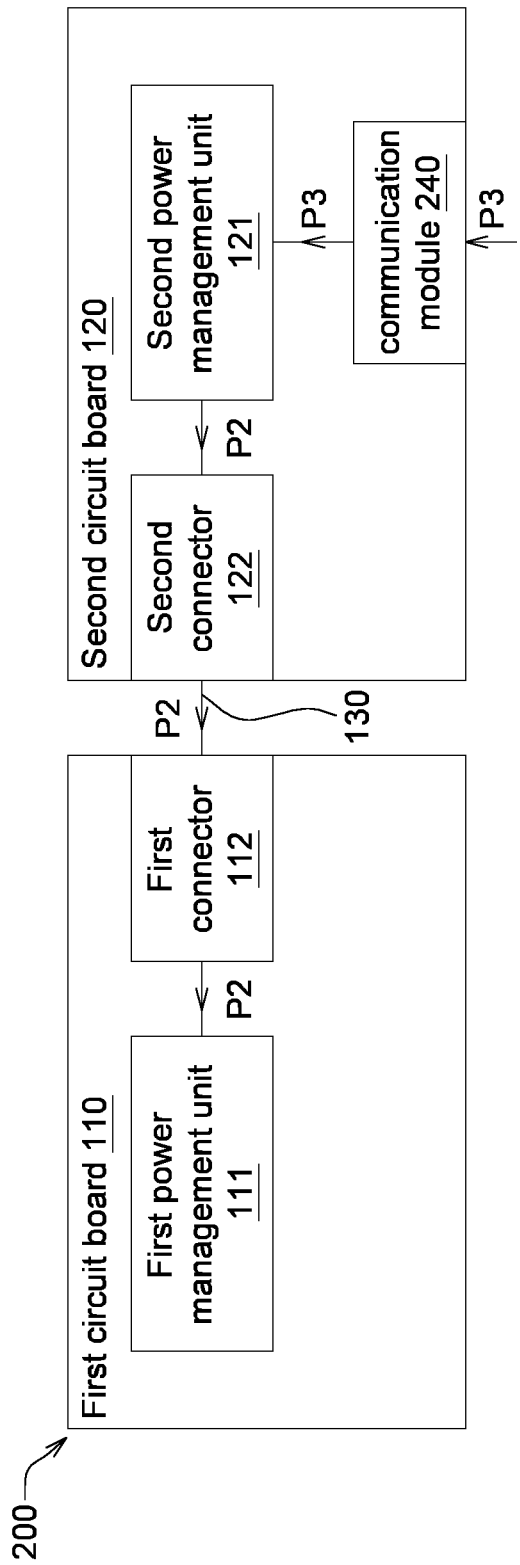
FIG. 2
FIG. 3A

POWER MANAGEMENT SYSTEM AND POWER MANAGEMENT METHOD

This application claims the benefit of People's Republic of China application Serial No. 201811201990.X7, filed on Oct. 16, 2018, the subject matter of which is incorporated herein by reference.

BACKGROUND OF THE INVENTION

Field of the Invention

The invention relates in general to a management system and management method, and more particularly to a power management system and a power management method.

Description of the Related Art

In the related art, the motherboard can be connected to an input/output circuit board (I/O board) to transmit signals between the motherboard and the input/output circuit board. Since the input/output circuit board cannot obtain the power state of the motherboard, the input/output circuit board is unable to change its own power state when the power state of the motherboard changes. Under such circumstance, the input/output circuit board will have poor efficiency in power utilization or will waste power.

SUMMARY OF THE INVENTION

The invention is directed to a power management system and a power management method capable of resolving the generally known problems encountered in the prior art.

According to one embodiment of the present invention, a power management system is provided. The power management system includes a first circuit board, a second circuit board and a connection cable. The connection cable is compatible with USB type-C specification and connects the first circuit board and the second circuit board. When the first circuit board determines that a first power state of the first circuit board changes, the first circuit board transmits a first signal to the second circuit board through a configuration channel (CC) terminal of the connection cable, and the second circuit board changes a second power state of the second circuit board according to the first signal.

According to another embodiment of the present invention, a power management system is provided. The power management system includes a first circuit board, a second circuit board, a connection cable and a communication module. The connection cable is compatible with USB type-C specification and connects the first circuit board and the second circuit board. The communication module is electrically connected to the second circuit board and configured to receive a control signal. The second circuit board generates a second signal according to the control signal, and further transmits the second signal to the first circuit board through the CC terminal of the connection cable. Under the circumstance that the first power state of the first circuit board and the second power state of the second circuit board are in one of the ACPI states S1 to S4, the first circuit board changes the first power state to the ACPI states S0 or another one of the ACPI states S1 to S4 according to the second signal.

According to an alternate embodiment of the present invention, a power management method is provided. The power management method includes the following steps. Firstly, a first circuit board, a second circuit board and a connection cable are provided, wherein the connection cable is compatible with USB type-C specification and connects the first circuit board and the second circuit board. When a first power state of the first circuit board changes, a first signal is transmitted to the second circuit board by the first circuit board through the CC terminal of the connection cable. A second power state of the second circuit board is changed by the second circuit board according to the first signal.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 2 is a flowchart of another power management method of the power management system of FIG. 1A.

FIG. 3A is a schematic diagram of a power management system according to another embodiment of the present invention.

DETAILED DESCRIPTION OF THE INVENTION

Figure 1A:
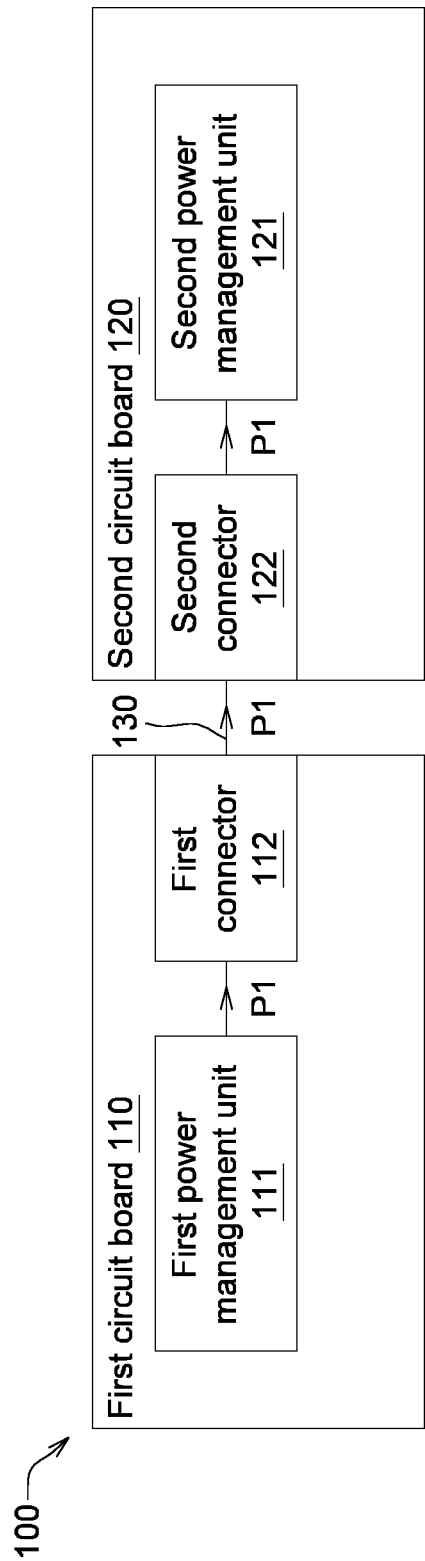
FIG. 1A is a schematic diagram of a power management system according to an embodiment of the present invention.
Figure 1B:
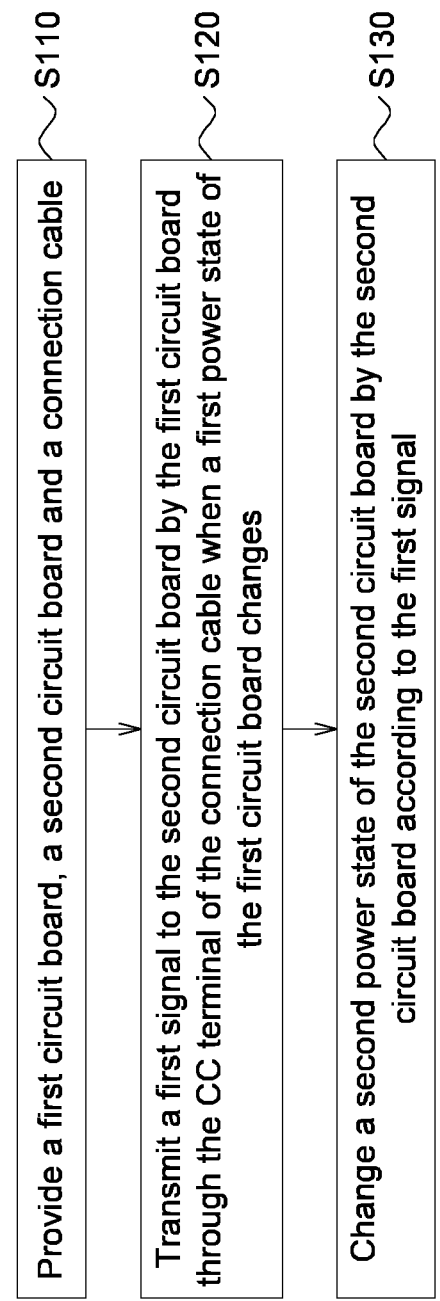
FIG. 1B is a flowchart of a power management method of the power management system of FIG. 1A.

Refer to FIGS. 1A and 1B. FIG. 1A is a schematic diagram of a power management system 100 according to an embodiment of the present invention. FIG. 1B is a flowchart of a power management method of the power management system 100 of FIG. 1A.

The power management system 100 includes a first circuit board 110, a second circuit board 120 and a connection cable 130. The connection cable 130 is compatible with USB type-C specification and connects the first circuit board 110 and the second circuit board 120. When the first circuit board 110 determines that a first power state of the first circuit board changes, the first circuit board 110 transmits the first signal P1 to the second circuit board 120 through a configuration channel (CC) terminal of the connection cable 130, and the second circuit board 120 changes a second power state of the second circuit board according to the first signal P1. Besides, the second circuit board 120 may provide power to the first circuit board 110 through the connection cable 130. The power supplied by the second circuit board 120 may come from a power source (such as a supply mains or an external battery), or the second circuit board 120 may include a battery for providing power to the second circuit board 120.

The first circuit board 110 includes a first power management unit 111 and a first connecting unit 112. The first circuit board 110 may further include other elements such as a central processing unit (CPU). The first power management unit 111 is configured to detect a first power state of the first circuit board 110. The first connecting unit 112 is compatible with USB type-C specification and configured to connect to the connection cable 130 for transmitting the first signal P1 to the second circuit board 120. In an embodiment, the first circuit board 110 can be realized by such as a CPU board of an electronic product. The electronic product is such as computer, mobile phone or other suitable electronic products.

The second circuit board includes 120 includes a second power management unit 121 and a second connecting unit 122. In the present embodiment, the first connecting unit 112 and the second connecting unit 122 both include a USB Type-C communication chip configured to receive and generate a corresponding command. When the first connecting unit 112 and the second connecting unit 122 are connected through the connection cable 130, the communication chip detects a host and a device and further distinguishes the host from the device. The second connecting unit 122 is connected to the connection cable 130 according to the USB Type-C specification and receive a first signal P1. The second power management unit 121 changes a second power state of the second circuit board 120 according to the first signal P1. The second circuit board 120 can be realized by such as an input/output circuit board (I/O board). Although it is not illustrated in the diagram, the second circuit board 120 may further include at least one connection port for connecting at least one external device. The connection port can be realized by such as a USB port, a high definition multimedia interface (HDMI), a network port RJ45 or a connector of other types. The external device can be realized by such as a flash drive. The second circuit board 120 further includes a connection port through which an external device can be connected to the second circuit board 120 and further electrically connected to the first circuit board 110 for performing communication between the first circuit board 110 and the second circuit board 120.

The power management method of the power management system of FIG. 1A 100 is disclosed below with accompany drawing FIG. 1B.

In step S110, the first circuit board 110, the second circuit board 120 and the connection cable 130 as indicated in FIG. 1A are provided.

Then, the method proceeds to step S120, when the first power state of the first circuit board 110 changes, the first signal P1 is transmitted to the second circuit board 120 by the first circuit board 110 through a CC terminal of the connection cable 130. Besides, "the first power state change" refers to the condition that the power consumption of the first circuit board 110 drops, for example, the first power state changes to one of the ACPI state S1 to S4, or the power of the electronic device connected to the first circuit board 110 is turned off, wherein the electronic device can be realized by such as a display.

In an embodiment, before the first circuit board 110 transmits the first signal P1 to the second circuit board 120 through the CC terminal of the connection cable 130, the first connecting unit 112 is set as a host, and the second connecting unit 122 is set as a device, such that the first signal P1 can be transmitted to the device from the host.

Then, the method proceeds to step S130, a second power state of the second circuit board 120 is changed by the second power management unit 121 according to the first signal P1. For example, when the power consumption of the first circuit board 110 drops, the second circuit board 120 can obtain the change in the first power state of the first circuit board 110 through the first signal P1 and accordingly change the second power state of the second circuit board by turning off the corresponding function of the second circuit board 120 or reducing the power supply. Thus, the power efficiency of the second circuit board 120 can be optimized and power waste can be reduced.

In the above embodiment, although the second circuit board 120 changes the second power state of the second circuit board according to the first power state of the first circuit board 110, the embodiment of the present invention is not limited thereto. In another embodiment, the first circuit board 110 may change the second power state of the first circuit board according to a signal of the second circuit board 120.

Referring to FIG. 2, a flowchart of another power management method of the power management system 100 of FIG. 1A is shown. In the present embodiment, under the circumstance that the first power state of the first circuit board 110 is in one of the ACPI states S1 to S4, when the second circuit board 120 transmits the second signal P2 to the first circuit board 110, the first power management unit 111 of the first circuit board 110 may change the first power state to the ACPI state S0 according to the second signal P2. To put it in greater details, when the first circuit board 110 are in a sleep or stand-by state, the second circuit board 120 may transmit the second signal P2 to the first circuit board 110 to wake up the first circuit board 110; or, the first circuit board 110 may change the second power state of the first circuit board to one of the ACPI S1 to S4 from the ACPI state S0 according to the second signal S2. In an embodiment, the second signal P2 can be emitted from the second power management unit 121 and transmitted to the first circuit board 110 through the second connecting unit 122.

In an embodiment, under the circumstance that both the first power state of the first circuit board 110 and the second power state of the second circuit board 120 are in one of the ACPI states S1 to S4, the first power management unit 111 of the first circuit board 110 may change the first power state to another one of the ACPI states S1 to S4 according to the second signal P2. In other words, when the first circuit board 110 and the second circuit board 120 are in a sleep or stand-by state, the first circuit board 110 can be woke up by the second signal P2 or the power state of the first circuit board 110 can be changed.

In another embodiment, under the circumstance that both the first power state of the first circuit board 110 and the second power state of the second circuit board 120 are in one of the ACPI states S1 to S4, when the first power state of the first circuit board 110 changes to another one of the ACPI states S1 to S4, the second power state of the second circuit board 120 also changes to another one of the ACPI states S1 to S4. In other words, given that the first circuit board 110 and the second circuit board 120 are in a sleep or stand-by state, when the first power state of the first circuit board 110 changes, the second power state of the second circuit board 120 also changes to the same state to balance the first power state of the first circuit board 110 and the second power state of the second circuit board 120.

In other embodiments, under the circumstance that both the first power state of the first circuit board 110 and the second power state of the second circuit board 120 are in one of the ACPI states S1 to S4, when the first power state of the first circuit board 110 changes to another one of the ACPI states S1 to S4 and the first power state of the first circuit board 110 changes to another one of the ACPI states S1 to S4, the second power state of the second circuit board 120 firstly changes to the ACPI state S0 and then changes to another one of the ACPI states S1 to S4. In other words, given that the first circuit board 110 and the second circuit board 120 are in a sleep or stand-by state, when the first power state of the first circuit board 110 changes, the second power state of the second circuit board 120 firstly changes to the ACPI state S0 (wake up) and then changes to the same state to balance the first power state of the first circuit board 110 and the second power state of the second circuit board 120.

In the present embodiment, before the second connecting unit 122 transmits the second signal P2 to the first connecting unit 112 through the CC terminal, the second connecting unit 122 is set as a host, and the first connecting unit 112 is set as a device, such that the second signal P2 can be transmitted to the device from the host. In the present embodiment, the second signal P2 can be generated in response to the triggering command T1 (the embodiment as indicated in FIG. 4A) or the control signal P3 (the embodiment as indicated in FIG. 3A).

Figure 3B:
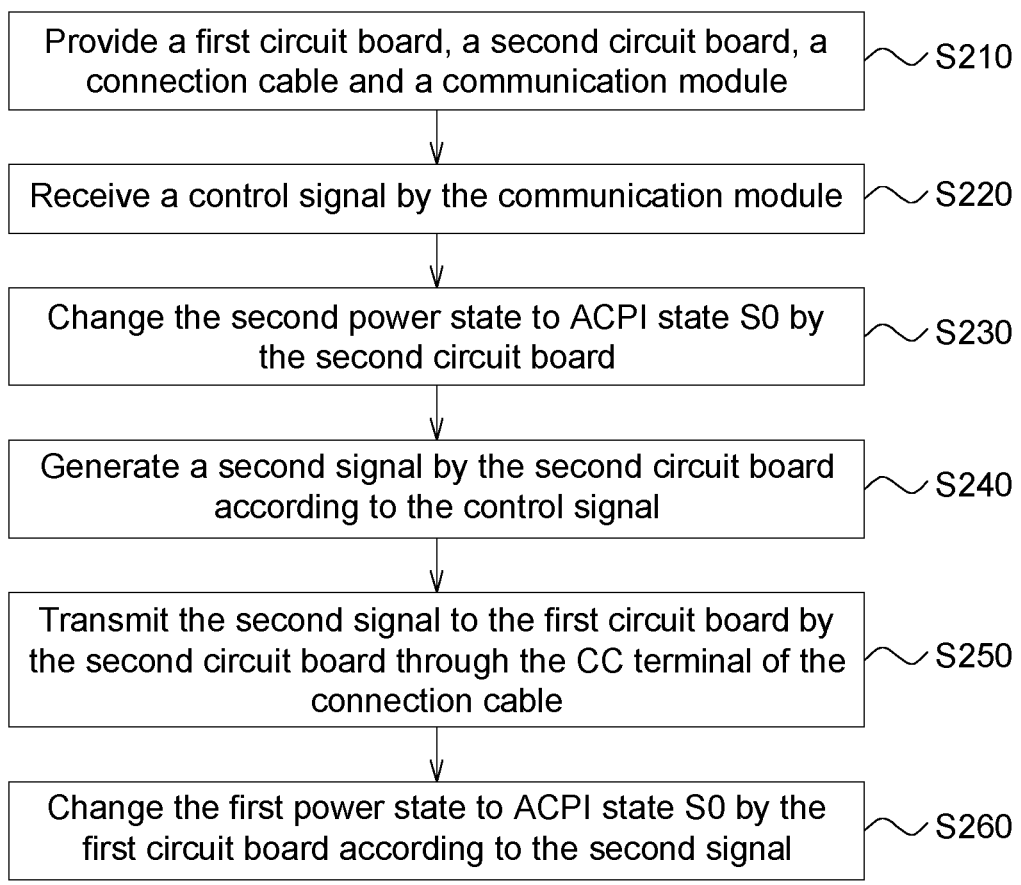
FIG. 3B is a flowchart of a power management method of the power management system of FIG. 3A.
Figure 4A:
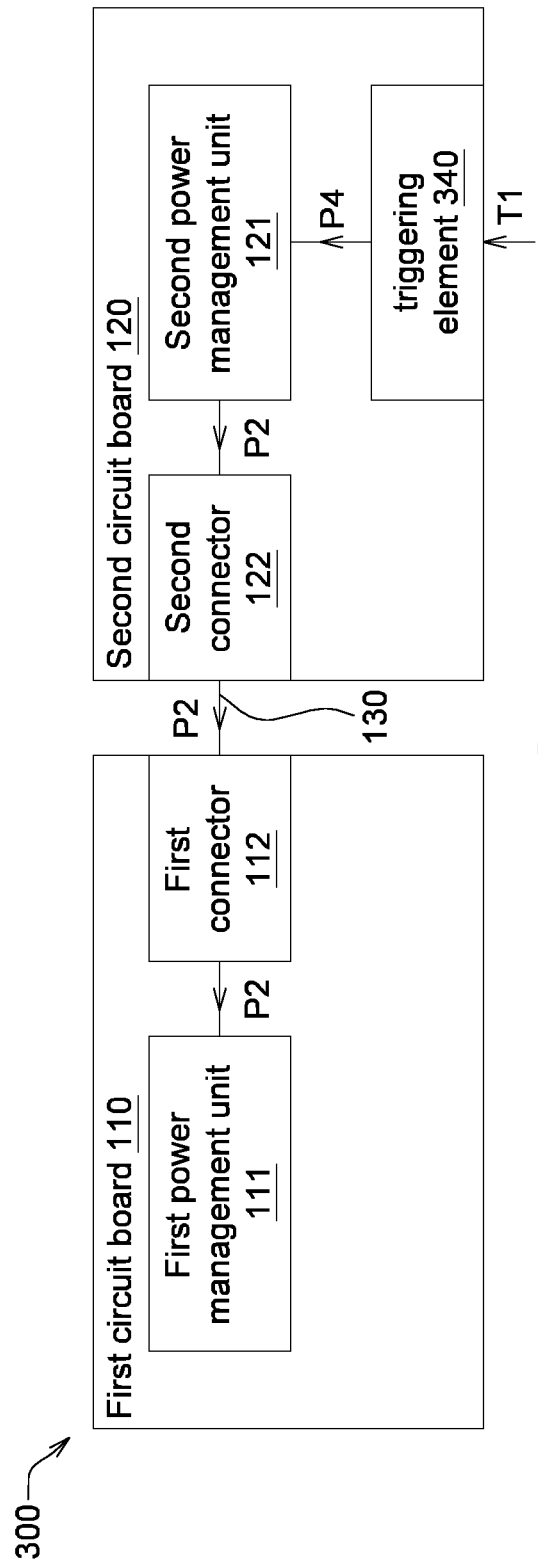
FIG. 4A is a schematic diagram of a power management system according to another embodiment of the present invention.

Refer to FIGS. 3A and 3B. FIG. 3A is a schematic diagram of a power management system 200 according to another embodiment of the present invention. FIG. 3B is a flowchart of a power management method of the power management system 200 of FIG. 3A.

The power management system 200 includes a first circuit board 110, a second circuit board 120, a connection cable 130 and a communication module 240. The communication module 240 is electrically connected to the second circuit board 120 and configured to receive the control signal P3. The control signal P3 may come from an external device, such as a computer, a mobile phone or a server. In the present embodiment, the communication module 240 can be built in the second circuit board 120 or separated from the second circuit board 120. The communication module 240 is connected to the connection port (not illustrated) of the second circuit board 120 (such as through insertion), and can be realized by such as a wireless communication module.

The second circuit board 120 generates the second signal P2 to the first circuit board 110 according to the control signal P3. The first power management unit 111 of the first circuit board 110 changes the first power state according to the second signal P2.

In an embodiment, under the circumstance that both the first power state of the first circuit board 110 and the second power state of the second circuit board 120 are in one of the ACPI states S1 to S4, the first power management unit 111 of the first circuit board 110 may change the first power state to another one of the ACPI states S1 to S4 according to the second signal P2. In other words, when the first circuit board 110 and the second circuit board 120 are in a sleep or stand-by state, the first circuit board 110 and the second circuit board 120 can be woke up by the control signal P3.

The power management method of the power management system of FIG. 3A 200 is disclosed below with accompany drawing FIG. 3B.

In step S210, the first circuit board 110, the second circuit board 120, the connection cable 130 and the communication module 240 as indicated in FIG. 3A are provided.

Under the circumstance that both the first power state of the first circuit board 110 and the second power state of the second circuit board 120 are in one of the ACPI states S1 to S4, the power management method further includes the following steps.

In step S220, a control signal P3 is received by the communication module 240.

In step S230, a second signal P2 is generated by the second circuit board 120 according to the control signal P3.

In step S240, the second signal P2 is transmitted o the first connecting unit 112 of the first circuit board 110 by the second connecting unit 122 of the second circuit board 120 through the CC terminal of the connection cable.

Before the second connecting unit 122 transmits the second signal P2 to the first connecting unit 112 through the CC terminal, the second connecting unit 122 is set as a host, and the first connecting unit 112 is set as a device, such that the second signal P2 can be transmitted to the device from the host.

In step S250, the first power state can be changed to another one of the ACPI states S1 to S4 by the first power management unit 111 of the first circuit board 110 according to the second signal P2, wherein the first circuit board 110 is woke up in the state S0.

In the power management method of another embodiment as indicated in FIG. 3B, when the first power state of the first circuit board 110 changes to another one of the ACPI states S1 to S4, the second power state of the second circuit board 120 also changes to another one of the ACPI states S1 to S4 to balance the first power state of the first circuit board 110 and the second power state of the second circuit board 120.

In the power management method of another embodiment as indicated in FIG. 3B, when the first power state of the first circuit board 110 changes to another one of the ACPI states S1 to S4, the second power state of the second circuit board 120 firstly changes to the ACPI state S0 and then changes to another one of the ACPI states S1 to S4 to balance the first power state of the first circuit board 110 and a second power state of the second circuit board 120.

Figure 4B:
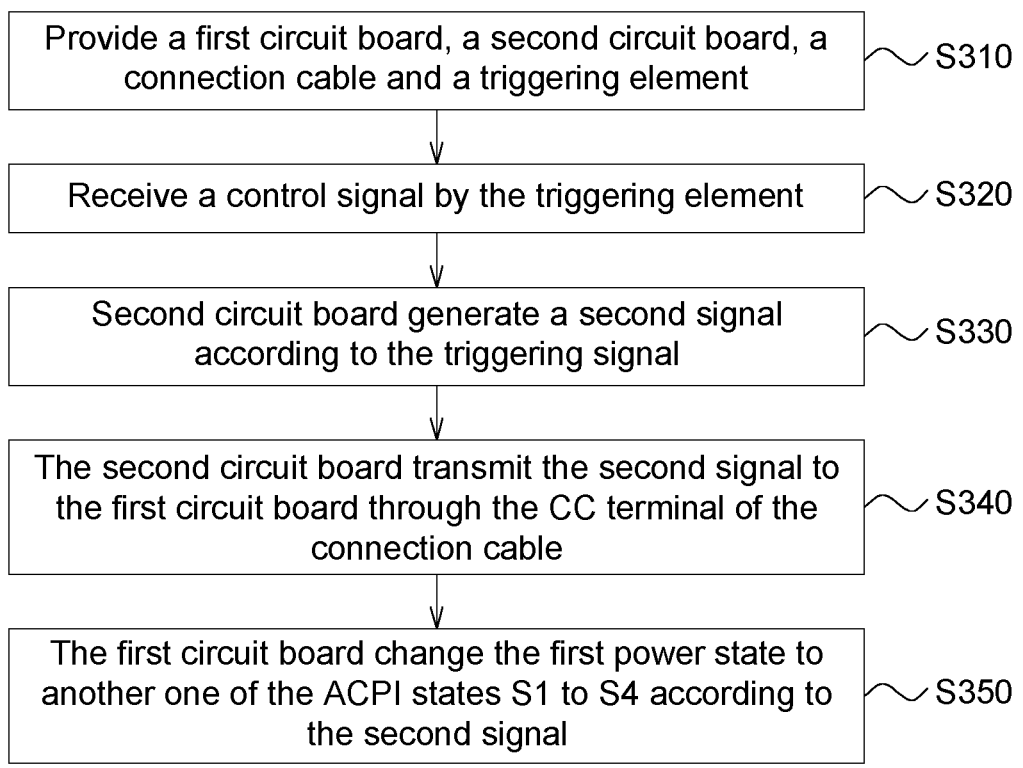
FIG. 4B is a flowchart of a power management method of the power management system of FIG. 4A.

Refer to FIGS. 4A and 4B. FIG. 4A is a schematic diagram of a power management system 300 according to another embodiment of the present invention. FIG. 4B is a flowchart of a power management method of the power management system 300 of FIG. 4A.

The power management system 300 includes a first circuit board 110, a second circuit board 120, a connection cable 130 and a triggering element 340. The triggering element 340 is electrically connected to the second circuit board 120 and configured to receive a triggering signal P4. The triggering element 340 can be realized by a switch disposed on the second circuit board 120 for receiving a triggering command T1 from the user and generating a triggering signal P4 according to the triggering command T1.

The second circuit board 120 generates a second signal P2 according to the triggering signal P4 generated by the triggering element 340, and further transmits the second signal P2 to the first circuit board 110. The first power management unit 111 of the first circuit board 110 changes the first power state according to the second signal P2.

In an embodiment, under the circumstance that both the first power state of the first circuit board 110 and the second power state of the second circuit board 120 are in one of the ACPI states S1 to S4, the second power management unit 121 of the second circuit board 120 may change the second power state to the ACPI state S0 according to the triggering signal P4, and the first power management unit 111 of the first circuit board 110 may change the first power state to another one of the ACPI states S1 to S4 according to the second signal P2. In other words, when the first circuit board 110 and the second circuit board 120 are in a sleep or stand-by state, the first circuit board 110 and the second circuit board 120 can be woke up by the triggering signal P4.

In another embodiment, the triggering element 340 can be realized by a lever or touch sensor disposed on the second circuit board 120. When the triggering element 340 is a lever. By adjusting the position of the lever, the first power state can be switched to the ACPI state S0 or another one of the ACPIS1 to S4. When the triggering element 340 is a touch sensor such as a touch panel capable of sensing a continuous touch count. The first power management unit 111 changes the first power state to another one of the ACPI states S1 to S4 according to the continuous touch count. For example, when continuous touch count is 1, the first power management unit 111 changes the first power state to the ACPI state S0; when continuous touch count is 2, the first power management unit 111 changes the first power state to another one of the ACPI states S1 to S4.

The power management method of the power management system of FIG. 4A 300 is disclosed below with accompanying drawing FIG. 4B.

In step S310, the first circuit board 110, the second circuit board 120, the connection cable 130 and the triggering element 340 as indicated in FIG. 4A are provided.

Under the circumstance that both the first power state of the first circuit board 110 and the second power state of the second circuit board 120 are in one of the ACPI states S1 to S4, the power management method further includes the following steps.

In step S320, a triggering signal P4 is generated by the triggering element 340 in response to a triggering command T1 of a user.

In step S330, a second signal P2 is generated by the second circuit board 120 according to the triggering signal P4.

In step S340, the second signal P2 is transmitted to the first connecting unit 112 of the first circuit board 110 by the second connecting unit 122 of the second circuit board 120 through the CC terminal of the connection cable.

Before the second connecting unit 122 transmits the second signal P2 to the first connecting unit 112 through CC terminal, the second connecting unit 122 is set as a host, and the first connecting unit 112 is set as a device, such that the second signal P2 can be transmitted to the device from the host.

In step S350, the first power state is changed to another one of the ACPI states S1 to S4 by the first power management unit 111 of the first circuit board 110 according to the second signal P2, wherein the first circuit board 110 is woke up in the state S0.

In the power management method of another embodiment as indicated in FIG. 4B, when the first power state of the first circuit board 110 changes to another one of the ACPI states S1 to S4, the second power state of the second circuit board 120 also changes to another one of the ACPI states S1 to S4 to balance the first power state of the first circuit board 110 and a second power state of the second circuit board 120.

A power management method of another embodiment as indicated in FIG. 4B, when the first power state of the first circuit board 110 changes to another one of the ACPI states S1 to S4, the second power state of the second circuit board 120 firstly changes to the ACPI state S0 and then changes to another one of the ACPI states S1 to S4 to balance the first power state of the first circuit board 110 and a second power state of the second circuit board 120.

In an embodiment, the first circuit board and the second circuit board are connected through a connection cable compatible with USB type-C specification, and a signal is emitted when the power state of one of the first circuit board and the second circuit board changes. The signal can be transmitted to another one of the first circuit board and the second circuit board through the CC terminal of the connection cable, and the another one of the first circuit board and the second circuit board can correspondingly change its power state according to the signal. In another embodiment, the second power state of the second circuit board can change along with the change in the first power state of the first circuit board. For example, when the power consumption of the first circuit board drops, the second circuit board can turn off corresponding function to save power consumption. In another embodiment, the first power state of the first circuit board can change according to the second signal of the second circuit board. For example, the first power state of the first circuit board can change to the ACPI state S0 from one of the ACPI states S1 to S4 according to the second signal. In another embodiment, the second circuit board can emit a second signal according to an external control signal or emit a second signal according to the triggering signal. In other embodiments, the second circuit board can change the second power state of the second circuit board according to the control signal or the triggering signal. For example, the second power state of the second circuit board can change to another one of the ACPI states S1 to S4 from one of the ACPI states S1 to S4.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power management system, comprising:
   a first circuit board;
   a second circuit board; and
   a connection cable compatible with USB type-C specification and connecting the first circuit board and the second circuit board;
   wherein when the first circuit board determines that a first power state of the first circuit board changes, the first circuit board transmits a first signal to the second circuit board through a configuration channel (CC) terminal of the connection cable, and the second circuit board changes a second power state of the second circuit board according to the first signal;
   wherein the first power state of the first circuit board is changed to one of the advanced configuration and power interface (ACPI) states S1 to S4 from the ACPI state S0.

2. The power management system according to claim 1, wherein the first circuit board comprises:
   a first power management unit configured to detect the first power state of the first circuit board; and
   a first connecting unit compatible with USB type-C specification and configured to connect to the connection cable and transmit the first signal to the second circuit board.

3. The power management system according to claim 2, wherein the second circuit board comprises:
   a second connecting unit compatible with USB type-C specification and configured to connect to the connection cable and receive the first signal; and
   a second power management unit configured to change the second power state of the second circuit board according to the first signal.

4. The power management system according to claim 1, wherein when the first power state of the first circuit board changes to one of the ACPI states S1 to S4, the first circuit board transmits the first signal to the second circuit board.

5. The power management system according to claim 1, wherein under that circumstance that the first power state of the first circuit board is in one of the ACPI states S1 to S4, when the second circuit board transmits a second signal to the first circuit board, the first circuit board changes the first power state to another one of the ACPI states S1 to S4 according to the second signal.

6. The power management system according to claim 5, further comprising:
a communication module electrically connected to the second circuit board and configured to receive a control signal;
wherein the second circuit board generates the second signal according to the control signal.

7. The power management system according to claim 6, wherein under the circumstance that both the first power state of the first circuit board and the second power state of the second circuit board are in one of the ACPI states S1 to S4, the first circuit board changes the first power state to another one of the ACPI states S1 to S4 according to the second signal.

8. The power management system according to claim 5, further comprising:
a triggering element electrically connected to the second circuit board and configured to generate a triggering signal in response to a triggering command;
wherein the second circuit board generates the second signal according to the triggering signal.

9. The power management system according to claim 8, wherein under the circumstance that both the first power state of the first circuit board and the second power state of the second circuit board are in one of the ACPI states S1 to S4, the first circuit board changes the first power state to another one of the ACPI states S1 to S4 according to the second signal.

10. The power management system according to claim 1, wherein under the circumstance that both the first power state of the first circuit board and the second power state of the second circuit board both are in one of the ACPI states S1 to S4, when the first power state of the first circuit board changes to another one of the ACPI states S1 to S4, the second power state of the second circuit board also changes to another one of the ACPI states S1 to S4.

11. The power management system according to claim 1, wherein under the circumstance that both the first power state of the first circuit board and the second power state of the second circuit board both are in one of the ACPI states S1 to S4, when the first power state of the first circuit board changes to another one of the ACPI states S1 to S4, the second power state of the second circuit board firstly changes to the ACPI state S0 and then changes to another one of the ACPI states S1 to S4.

12. A power management system, comprising:
a first circuit board;
a second circuit board;
a connection cable compatible with USB type-C specification and connecting the first circuit board and the second circuit board; and
a communication module electrically connected to the second circuit board and configured to receive a control signal;
wherein the second circuit board generates a second signal according to the control signal and further transmits the second signal to the first circuit board through the CC terminal of the connection cable; and
wherein under the circumstance that both the first power state of the first circuit board and the second power state of the second circuit board are in one of the ACPI states S1 to S4, the first circuit board changes the first power state to another one of the ACPI states S1 to S4 according to the second signal.

13. A power management method, comprising: providing a first circuit board, a second circuit board and a connection cable, wherein the connection cable is compatible with USB type-C specification and connects the first circuit board and the second circuit board;
transmitting a first signal to the second circuit board by the first circuit board through the CC terminal of the connection cable when a first power state of the first circuit board changes;
changing the first power state of the first circuit board to one of the ACPI states S1 to S4 from the ACPI state S0; and
changing a second power state of the second circuit board by the second circuit board according to the first signal.

14. The power management method according to claim 13, wherein the step of transmitting the first signal to the second circuit board by the first circuit board through the CC terminal of the connection cable comprises:
transmitting the first signal to the second circuit board by the first circuit board when the first power state of the first circuit board changes to one of the ACPI states S1 to S4.

15. The power management method according to claim 13, further comprising:
under the circumstance that the first power state of the first circuit board is in one of the ACPI states S1 to S4, changing the first power state to state S0 or another one of the ACPI states S1 to S4 by the first circuit board according to a second signal when the second circuit board transmits the second signal to the first circuit board.

16. The power management method according to claim 15, further comprising:
receiving a control signal by a communication module electrically connected to the second circuit board; and
wherein in the step of changing the first power state to the ACPI state S0 or another one of the ACPI states S1 to S4 by the first circuit board according to the second signal, the second circuit board generates the second signal according to the control signal.

17. The power management method according to claim 15, further comprising:
generating a triggering signal by a triggering element in response to a triggering command, wherein the triggering element is electrically connected to the second circuit board;
wherein in the step of changing the first power state to the ACPI state S0 or another one of the ACPI states S1 to S4 by the first circuit board according to the second signal, the second circuit board generates the second signal according to the triggering signal.

18. The power management method according to claim 13, further comprising:
providing a communication module electrically connected to the second circuit board;
under the circumstance that the first power state of the first circuit board is in one of the ACPI states S1 to S4, transmitting a second signal to the first circuit board by the second circuit board through the CC terminal of the connection cable when the communication module receives a control signal; and
changing the first power state to the ACPI state S0 by the first circuit board according to the second signal.

19. The power management method according to claim 18, further comprising:

disposing a first connecting unit compatible with USB type-C specification on the first circuit board for connecting the connection cable; and disposing a second connecting unit compatible with USB type-C specification on the second circuit board for connecting the connection cable;

wherein when the first connecting unit transmits a first signal to the second circuit board through the CC terminal, the first connecting unit is set as a host, and the second connecting unit is set as a device; when the second connecting unit transmits the second signal to the first circuit board through the CC terminal, the second connecting unit is set as a host, and the first connecting unit is set as a device.

* * * * *